(12) United States Patent
Nakamura et al.

(10) Patent No.: US 6,241,937 B1
(45) Date of Patent: Jun. 5, 2001

(54) PROCESS FOR THE PRODUCTION OF POLYOLEFIN MOLDINGS

(75) Inventors: Masanori Nakamura; Satoru Yamamoto, both of Kyoto (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 09/284,950
(22) PCT Filed: Oct. 30, 1997
(86) PCT No.: PCT/JP97/03947
 § 371 Date: Apr. 27, 1999
 § 102(e) Date: Apr. 27, 1999
(87) PCT Pub. No.: WO98/18611
 PCT Pub. Date: May 7, 1998
(30) Foreign Application Priority Data Oct. 31, 1996 (JP) ................................................... 8-290257

(51) Int. Cl.$^7$ ............................. B29C 71/04; B29C 47/94
(52) U.S. Cl. ..................... 264/470; 264/477; 264/210.6; 264/210.7; 264/290.2; 264/210.2
(58) Field of Search .................................... 264/470, 477, 264/210.7, 210.6, 290.2; 425/363, 210.2

(56) References Cited

U.S. PATENT DOCUMENTS 5,505,900   4/1996   Suwanda et al. .

FOREIGN PATENT DOCUMENTS 0206672A   12/1986   (JP) .

*Primary Examiner*—Jan H. Silbaugh
*Assistant Examiner*—Mark Eashoo
(74) *Attorney, Agent, or Firm*—Townsend & Banta

(57) ABSTRACT

A polyolefin shaped article having high strength and high modulus is efficiently manufactured without a need to accompany a process of removing a flow modifier or the like.

A method is characterized as including the steps of melt forming a composition principally containing 100 parts by weight of high-density polyolefin, such as high-density polyethylene, and 1–30 parts by weight of a polymerizable monomer or oligomer having a preferred affinity for the high-density polyolefin into a sheet or film, calendering and stretching the sheet or film, and then polymerizing the polymerizable monomer or oligomer incorporated in the sheet or film.

16 Claims, No Drawings

PROCESS FOR THE PRODUCTION OF POLYOLEFIN MOLDINGS

TECHNICAL FIELD

The present invention relates to a method for manufacture of polyolefin shaped articles having high strength and high modulus.

BACKGROUND ART

For manufacture of polyolefin having high strength and modulus, Japanese Patent Laying-Open No. Hei. 1-280013 discloses a method wherein ultra-high molecular weight polyethylene and a flow modifier such as paraffin wax are melt kneaded at a temperature above a melting point of the ultra-high molecular weight polyethylene and extruded from a die into a shaped article which is subsequently subjected to multi-stage stretching. The publication states that such a method permits the highly productive and simple manufacture of ultra-high molecular weight polyethylene having high strength and modulus on an industrial scale.

However, the method described in the above-identified publication requires the use of a solvent to remove the flow modifier either during or subsequent to the stretching process. This not only adds to operating time but also poses a problem of increased manufacturing cost resulting from the need to use the solvent for removal of the flow modifier.

DISCLOSURE OF THE INVENTION

An object of the present invention resides in its provision of a manufacturing method by which a polyolefin shaped article having high strength and modulus can be efficiently manufactured, thus obviating a need for a process of removing the flow modifier.

The present invention, as recited in claim 1, is a method for manufacture of a polyolefin shaped article, which is characterized as including the steps of melt forming a composition principally containing 100 parts by weight of high-density polyolefin and 1–30 parts by weight of a polymerizable unsaturated compound having a preferred affinity for the high-density polyolefin into a sheet or film, calendering the sheet or film obtained, stretching the calendered sheet or film, and polymerizing the polymerizable unsaturated compound incorporated in the stretched sheet or film.

In the method for manufacture of a polyolefin shaped article in accordance with the present invention, high molecular weight polyolefin is preferably employed for the above-specified high-density polyolefin, as recited in claim 2.

Also, in a particular aspect of the present invention, the aforementioned composition further contains a free-radical generator, as recited in claim 3.

Preferably, a photoinitiator is employed for the above free-radical generator and the step of polymerizing the polymerizable unsaturated compound, which follows the stretching step, is carried out by ultraviolet irradiation, as recited in claim 4.

Alternatively, the step of polymerizing the polymerizable unsaturated compound may be performed by electron beam irradiation, as recited in claim 5.

Also, in a particular aspect of the present invention, the aforementioned polymerizable unsaturated compound consists at least partly of a trifunctional compound, as recited in claim 6.

In the method for manufacture of a polyolefin shaped article in accordance with the present invention, in the step of calendering the aforementioned sheet or film, the calendering is performed at a calender ratio preferably within the range of 2–10, as recited in claim 7.

It is also preferred that, in the step of stretching the aforementioned sheet or film, the stretching is performed at a stretch ratio preferably of at least 2, as recited in claim 8.

In a narrower aspect of the present invention, high-density polyethylene having a weight average molecular weight within the range of 200,000–500,000 is employed for the aforementioned high-density polyolefin, as recited in claim 9.

Where high-density polyethylene is employed as the aforementioned high-density polyolefin, it is preferred that, in the calendering step, the calendering is performed at a temperature within the range of 70–120° C., as recited in claim 10. It is also preferred that, in the stretching step, the stretching is carried out at a temperature ranging from 70° C. to a melting point of high-density polyethylene, as recited in claim 11.

Preferably, the method for manufacture of a polyolefin shaped article in accordance with the present invention further includes a step of subjecting the sheet or film, at least prior to being stretched, to heat treatment as recited in claim 12.

Also, the above-specified stretching step may be a multi-stage stretching step wherein stretching is effected in the same direction as a calendering direction by two or more stages and wherein stretching at a final stage is effected equi-directionally at an orientation temperature within a range of 35° C. to 5° C. reduction from an orientation temperature used in stretching at a stage immediately before the final stage, as recited in claim 13.

A detailed explanation of the present invention is given below.

The high-density polyolefin resin for use in the present invention is not particularly specified, so long as it is highly crystalline. Useful high-density polyolefin resins include homopolymers such as polyethylene, polypropylene, 1-butene, and 1-pentene; and copolymers containing not higher than 10 weight % of copolymeric components such as vinyl monomer units including vinyl acetate, vinyl alcohol, vinyl chloride and acrylic acid.

Preferably, high-molecular weight high-density polyolefin having a high weight-average molecular weight is suitably used for the high-density polyolefin resin, since it is able to impart increased mechanical properties, such as strength and modulus, to a resulting polyolefin shaped article. The high-molecular weight polyolefin, as used herein, refers to polyolefin which, like the below-described high-density high-molecular weight polyethylene, has a weight-average molecular weight of a level sufficiently high to impart increased mechanical properties, such as strength and modulus. Its weight-average molecular weight depends upon the particular type of polyolefin used, but is generally not lower than 200,000.

In the present invention, preferred among the above-listed resins is the high-density polyethylene resin.

A useful high-density polyethylene resin has a weight-average molecular weight preferably in the range of 200,000–500,000. If the weight-average molecular weight is below 200,000, stretching to orientate molecular chains may result in the failure to achieve desired improvements in strength and modulus. On the other hand, if the weight-average molecular weight exceeds 500,000, melt formation may fail, as is typically the case with ultra-high-molecular-weight polyethylene. Accordingly, the use of high-density high-molecular weight polyethylene having a weight-average molecular weight in the range of 200,000–500,000, as specified above, results in the further increased mechanical properties, such as strength and modulus, relative to using low molecular weight polyethylene.

Also, where a high-density polyethylene resin is used, its density is not lower than 0.94 g/cm$^3$. If the density is low, stretching may result in the failure to achieve the desired improvements in strength and modulus. Also, its melt index (MI) is preferably in the range of 0.1–20, more preferably in the range of 0.1–10. If the melt index is lower than 0.1, an increased load may be imposed on a fabricating machine such as an extruder. If it exceeds 20, fabrication may become difficult.

In the present invention, a composition which contains 100 parts by weight of high-density polyolefin and 1–30 parts by weight of polymerizable unsaturated compound having a preferred affinity for the high-density polyolefin is used as a starting material. If the polymerizable unsaturated compound content is less than 1 part by weight, the incorporation thereof may not always be effective to achieve expected improvement in stretchability. On the other hand, if it exceeds 30 parts by weight, the polymerizable unsaturated compound may be caused to bleed on a surface of a shaped article, which not only lowers handling characteristics but also adversely affects stretchability.

The present invention will be now described in more detail with reference to an exemplary case where a high-density polyethylene resin is used as a representative high-density polyolefin. It should be recognized, however, that the use of the other types of polyolefins also results in the successful manufacture of polyolefin shaped articles, if properly processed in a manner as described below.

The aforementioned polymerizable unsaturated compound having a preferred affinity for a high-density polyethylene resin is not particularly specified, so long as it is a low molecular weight unsaturated compound having a basic nature of being readily mixed in the high-density polyethylene resin. Various types of polymerizable monomers and/or polymerizable oligomers can be employed for the polymerizable unsaturated compound. Examples of those polymerizable monomers and oligomers include acrylic monomers and oligomers, and vinyl monomers and oligomers.

Specific examples of polymerizable monomers include trimethylolpropane triacrylate, trimethylolpropane trimethacrylate, diallyl phthalate, triallyl isocyanurate, hexanediol diacrylate, dipentaerythritol pentacrylate, isobornyl acrylate, and 2-phenoxyether acrylate.

Examples of polymerizable oligomers include epoxy acrylate, urethane acrylate, polyester acrylate, silicone acrylate, as well as special oligomers such as liquid butadiene.

Particularly suitable for use as the aforementioned polymerizable unsaturated compounds are trifunctional compounds, such as trimethylolpropane triacrylate, trimethylolpropane trimethacrylate and triallyl isocyanurate, since they are highly reactive and the use thereof reduces a tendency that the polymerizates, subsequent to being stretched, exudate onto their surfaces.

In the present invention, a free-radical generator, as illustrated by various types of organic peroxides and photoinitiators, may preferably be added to promote polymerization of the aforementioned polymerizable monomers and oligomers. The free-radical generator may be added in the amount preferably of 3–5 parts by weight, based on 100 parts by weight of the polymerizable unsaturated compound. Specific examples of the aforementioned organic peroxides include di-tert-butyl peroxide, dicumyl peroxide, tert-butyl cumyl peroxide and the like. Specific examples of photoinitiators include acetophenone, benzophenone, thioxanthone, benzoin, Michler's ketone and the like.

In a case where the free-radical generator is a photoinitiator, incorporation thereof in a sheet or film, i.e., in a shaped article, can be achieved by a method wherein a composition prepared, prior to being fabricated, by mixing a high-density polyethylene resin, a polymerizable unsaturated compound and a photoinitiator is melt kneaded in an extruder during fabrication, for example. In the case of organic peroxide, it may be pregnated in a shaped article by a method wherein the shaped article containing a melt kneaded mixture of high-density polyethylene and a polymerizable unsaturated compound is immersed in a solvent into which organic peroxide has been previously dissolved.

A photoinitiator is a particularly preferred free-radical generator for its nature to be readily mixed and easily handled. Among photoinitiators, benzophenone and thioxanthone are particularly suitable for use as the free-radical generator.

When the aforementioned composition is melt processed as by an extruder, a melt temperature is chosen to be preferably not lower than 130° C., more preferably not lower than 140° C. If the melt temperature falls below 130° C., incomplete melting of the resin likely results to reduce its compatibility with the polymerizable unsaturated compound, possibly leading to reduced stretchability in the subsequent stretching process. On the other hand, if the melt temperature is increased excessively, the high-density polyethylene resin and photoinitiator may be caused to decompose or evaporate. Thus, the melt temperature is preferably controlled not to substantially exceed 250° C.

In the present invention, the use of high-density high-molecular weight polyethylene imparts further increased mechanical properties, such as strength and modulus, relative to using low molecular weight polyethylenes. Where high-molecular weight polyethylene is. used, it is preferred that its weight-average molecular weight is at least $2\times10^5$. If the weight-average molecular weight is below this value, stretching to orientate molecular chains unlikely improves strength and modulus. On the other hand, if a polyethylene molecular weight is increased excessively, melt fabrication thereof may become impossible, as is typically the case with ultra-high-molecular-weight polyethylene. It is thus preferred that its weight-average molecular weight does not substantially exceed $5\times10^5$.

In the present invention, the melt composition prepared in the manner as stated above is first formed into a sheet or film. Any forming technique can be employed including conventional rolling and calendering techniques. An initial thickness of the shaped article exerts a significant influence on the subsequent calendering process. That is, as the thickness of the shaped article increases, a force required for calender rolls in compressing the shaped article, i.e., a so-called pressure force, becomes greater. This causes increased deflection of calender rolls to result in the failure to achieve uniform calendering in a width direction. On the other hand, if the shaped article is excessively thin, the shaped article after being subjected to calendering is also thinned excessively. In addition, opposing calender rolls are caused to contact with each other to possibly result in the reduction of service lives thereof. Accordingly, the thickness of the shaped article is preferably in the range of 0.5–4 mm.

In the present invention, the sheet or film formed in the manner as described above may be subjected to heat treatment, prior to being calendered or stretched. Subjecting the sheet or film to heat treatment is preferred for its effectiveness to arrange crystalline state thereof, facilitate subsequently-performed stretching operation and improve a degree of orientation.

The aforementioned heat treatment is not particularly limited, but is preferably performed under pressure in a closed container to prevent the polymerizable unsaturated compound melt-mixed in the sheet from escaping in the form of vapor.

In the present invention, the sheet or film formed in the manner as described above is then rolled or calendered. Calendering may be carried out by using a commonly-employed technique, i.e., by providing a clearance, smaller in dimension than the thickness of the shaped article, between a pair of counterrotating calender rolls, and introducing the shaped article between the calender rolls so that the shaped article is reduced in thickness and extended. If a temperature of the calender rolls in a calendering process is excessively low, uniform calendering may be impaired by the increased pressure force. On the other hand, if it is excessively high, the shaped article may be melt broken. Therefore, in the calendering process, the temperature of the calender rolls is kept preferably within the range of 70–120° C., more preferably within the range of 90–115° C. Also, an excessive reduction in calender ratio may result not only in the failure to gain an expected calendering effect, but also in imposing the increased burden on the subsequent stretching process. On the other hand, if the calender ratio is excessively high, uniform calendering may be impaired by the increased pressure force. In addition, the shaped article may be thinned excessively to result in breakage thereof when subsequently subjected to stretching. Accordingly, the calender ratio is preferably in the range of 2–10. The calender ratio, as used herein, is defined by the following relationship:

(Calender ratio)=(thickness of the shaped article prior to being calendered)/(thickness of the shaped article after being calendered)

In the present invention, the sheet or film calendered in the manner as stated above is then stretched. A variety of stretching techniques can be employed including conventional roll and zone stretching techniques. The roll stretching technique refers to a technique wherein a pair of rolls rotating at different speeds is operated to interpose a sheet therebetween while heating the sheet so that the sheet is stretched, and is a technique which can orientate molecular chains predominantly uniaxially. In this case, a speed ratio of the pair of rolls gives a stretch ratio. The zone stretching technique is a technique which locally stretches a sheet by heating local areas of the sheet by a heater or a hot air, and accordingly presents such benefits that the sheet while stretched is restrained from thermally degrading and that the reduction in width of the sheet is minimized to permit uniform stretching of the sheet.

In the present invention, the roll stretching technique is suitably employed which requires no special equipment, which can readily control a stretch ratio and which is highly productive. Techniques to heat the shaped article include hot air, hot water, infrared and microwave heating. Among these, hot air heating is suitably employed which can be performed by using simple equipments and is able to control a temperature without difficulty. The stretching may be carried out in a single or multiple stages. Generally, a multi-stage stretching technique, which effects repeated stretching at low stretch ratios, reduces the occurrence of breakage of a sheet while stretched to insure stable stretching thereof. However, the increased number of stage, while effective in obtaining enhanced stability and increased stretch ratio, accompanies scale-up of equipments to be used. Accordingly, stretching may preferably be performed substantially in two to five stages.

Also, an orientation temperature is chosen to fall within the range from 70° C. to a melting temperature of high-density polyethylene used, more preferably within the range from 80° C. to a temperature 10° C. lower than the melting point of polyethylene. The melting point, as used herein, refers to a maximum point of endothermic peaks accompanying fusion of crystal, which can be identified in the thermal analysis as by a differential scanning calorimeter (DISC). If the stretching is effected at a temperature lower than 70° C., whitening of a shaped article may result. If effected at a temperature above the melting point, stretching may not always be effective to achieve desired improvement in strength to possibly result in breakage of the shaped article.

In the stretching process, the stretch ratio is chosen to be preferably not less than 2, more preferably in the range of 3–10. If the stretch ratio is below 2, desired improvements in strength and modulus of the shaped article may not be obtained. On the other hand, care should be taken when increasing the stretch ratio. The excessively increased stretch ratio may result in the increased occurrence of breakage of the shaped article while. stretched. The stretch ratio, as used herein, is defined by the following relationship:

(Stretch ratio)=(sectional area of the shaped article prior to being stretched)/(sectional area of the shaped article after being stretched).

As stated earlier, the orientation temperature is desired to fall within the range from 70° C. to the melting point of high-density polyethylene used. Particularly in the case of the aforementioned multi-stage stretching wherein a sheet is stretched in the same direction as a calendering direction by two or more stages, the below-stated result may favorably arise if stretching at a final stage is effected at an orientation temperature within a range of 35° C. to 5° C. reduction from an orientation temperature used in stretching the sheet at a stage immediately before the final stage. That is, if the orientation temperature at the final stage is reduced to a level as specified above, microvoids can be forcibly and stably produced in the sheet to possibly result in the density reduction of the sheet, which is favored in some cases.

In such a case, if the orientation temperature at the final stage goes beyond a temperature reduced by 5° C. from the orientation temperature used in stretching the sheet at the stage immediately before the final stage, the multi-stage stretching may result in the failure to stably produce microvoids, accordingly leading to the failure to achieve the adequate density reduction of the sheet. In addition, non-uniform production of voids may result in the reduced uniformity of the sheet. On the other hand, if the orientation temperature at the final stage falls below a temperature reduced by 35° C. from the orientation temperature used in stretching at the stage immediately before the final stage, the excessively reduced temperature may result in the failure to achieve smooth stretching at the final stage.

The sheet in which the aforementioned microvoids are produced is usually in a stable whitened state. On the other hand, unless such production of microvoids is desired, the sheet may be further stretched immediately after the final stage to remove those microvoids.

In the present invention, the polymerizable unsaturated compound incorporated in the sheet or film after being stretched is not removed but subjected to polymerization. By subjecting to polymerization, an extremely time-consuming procedure to remove such compound can be omitted, leading to a marked improvement in productivity. Polymerization of the polymerizable unsaturated compound can be achieved by heating or by irradiation with ultraviolet or electron rays. The ultraviolet irradiation is most preferred. If heating is selected, the applied heat may cause a shaped article to shrink, possibly resulting in the reduction of physical properties thereof once improved by the stretching. At worst, the shaped article may be caused to melt. If the electron beam irradiation is selected, the requirement of expensive equipments raises an initial cost, leading to the increase in price of the shaped article. When the ultraviolet irradiation is selected, the aforementioned photoinitiator may preferably be incorporated in the shaped article to promote polymerization.

(FUNCTION)

In the present invention, mechanical properties of a shaped article, typically in tensile strength and modulus, can be improved by stretching the shaped article which have been previously improved in extensibility by inclusion of the polymerizable unsaturated compound, such as a polymeric monomer or polymeric oligomer, which is an alternative to a plasticizer. Also, the polymerizable unsaturated compound is subjected to polymerization after the stretching process, so that a conventionally-employed procedure for removal thereof is made unnecessary. This accordingly permits the highly productive manufacture of polyolefin shaped articles having high strength and modulus. Besides, since the polymerizable unsaturated compound is subjected to polymerization after the stretching process, its migration onto a shaped article surface, so-called bleeding phenomenon, can be prevented.

In accordance with the present invention, high-density polyolefins, particularly high-density high-molecular weight polyolefins having weight-average molecular weights in the approximate range of 200,000–500,000 can be subjected to stretching to result in a marked improvement in strength and modulus thereof, while conventionally considered to be very difficult due to a large degree of entanglement of molecular chains.

Also in the present invention, a sheet or film may be subjected to heat treatment prior to being calendered or stretched. Subjecting the sheet or film to heat treatment for at least an hour at a temperature sufficient to cause adequate transformation of crystals, which in the case of a polyethylene resin is within the range from 70° C. to a melting point of the polyethylene resin, is effective to impart an increased degree of crystallinity. This is considered to result in a reduced degree of entanglement between polyethylene molecules. Such a heat treatment assures a smooth performance of the subsequent stretching, leading accordingly to the successful improvement in degree of orientation.

EMBODIMENTS OF THE INVENTION

Examples 1–17 and Comparative Examples 1–8

(1) Preparation of Substrate Sheets or Films

Various types of high-density polyolefins, as listed in Tables 1 and 2, were used. More specifically, high-density polyethylene having a weight-average molecular weight of $3.3 \times 10^5$ and a melting point of 135° C. (manufactured by Mitsubishi Chem. Co., Ltd., grade: HY540, density: 0.961) was used in Examples 1–3, 6–9 and 11–17 and in Comparative Examples 1–4 and 6; high-density polyethylene having a weight-average molecular weight of $1.5 \times 10^5$ and a melting point of 136° C. (manufactured by Mitsubishi Chem. Co., Ltd., grade: HJ560W, density: 0.964) in Example 4 and Comparative Example 5; high-density polyethylene having a weight-average molecular weight of $2.2 \times 10^5$ and a melting point of 132° C. (manufactured by Mitsui Petrochem. Co., Ltd., grade: 5000SR, density: 0.958) in Example 5; and high-density polypropylene having a weight-average molecular weight of $1.5 \times 10^5$ and a melting point of 165° C. (manufactured by Mitsubishi Chem. Co., Ltd., grade: MA3) in Example 10 and Comparative Examples 7 and 8.

Added to any of the aforementioned high-density polyolefins were trimethylolpropane triacrylate, trimethylolpropane trimethacrylate, triallyl isocyanurate or divinyl benzene, and benzophenone as a free-radical initiator, respectively in the amounts as listed in Table 1. Each of the resulting resin mixtures was melt at a resin temperature of about 180° C. by using a corotating twin-screw extruder (manufactured by Ikegai Tekko Co., Ltd., PCM30), and then passed through a calendering machine maintained at a roll temperature of 80° C., so that the resin mixture was shaped into a tape form 60 mm wide and 0.7 mm thick. The amounts given in Table 1 are all expressed in parts by weight, based on 100 parts by weight of high-density polyolefin used.

As apparent from Table 1, instead of trimethylolpropane trimethacrylate which is a trifunctional compound, divinyl benzene, a bifunctional compound, was used in Example 6.

In Example 7, divinyl benzene was not added. This is because polymerization in Example 7 was carried out by electron irradiation, as described below.

Neither of the aforementioned polymerizable unsaturated compound and benzophenone was added in Comparative Examples 1, 5 and 7. Benzophenone was not added in Comparative Example 6.

(2) Heat Treatment Process

Solely in Example 8, a resulting sheet was, prior to being calendered, subjected to heat treatment. That is, a high-density polyethylene prepared in the same manner as in Example 2 was heat treated in a container maintained at 130° C. for 8 hours, prior to being calendered.

(3) Calendering Process

With the exception of Example 15 (a calender ratio of 8.9), the respective sheets or films were calendered at calender ratios of about 7, as indicated in Table 1, by using heat rolls (manufactured by Kodaira Seisakusho Co., Ltd., a roll diameter of 6 inches) controlled at a temperature of 115° C.

Also, the calendering temperature was controlled at 145° C. in Examples 10 and Comparative Examples 7 and 8, and at 85° C. in Example 17.

(4) Stretching Process

A hot-air heating type roll stretcher was employed to stretch the calendered sheets or films first at a stretch ratio of 1.8 and then at a maximum stretch ratio that they can be stretched without breakage. During the stretching, an orientation temperature was maintained at 95° C. An overall orientation ratio, as given in the following Tables 3 and 4, is a product of the calender ratio and stretch ratio.

In Example 9, the two-stage stretching was effected at different temperatures and at different stretch ratios, i.e., the sheet or film calendered according to the procedure of Example 2 was stretched by the hot-air heating type roll stretcher, first at a stretch ratio of 1.8 at a temperature of 95° C. and then at a stretch ratio of 2.7 at an orientation temperature of 80° C.

In Example 10, both first-stage and second-stage orientation temperatures were set at 160° C.

(5) Polymerizing Process

The shaped articles, after stretched, were passed at a speed of 10 m/min through an apparatus equipped with two opposing sets of three electrodeless ultraviolet lamps (manufactured by Fusion Japan Co., Ltd.), so that a top surface of each article was exposed to one set of the UV lamps while a bottom surface thereof was exposed to another set of the UV lamps. This procedure induced polymerization of polymerizable monomers incorporated in the shaped articles.

As can be seen from Table 2, the UV irradiation was not carried out in Comparative Examples 3, 4 and 8.

In Example 7, instead of UV irradiation, EB irradiation was carried out at a dosage of 10 Mrads for 2 seconds at an ordinary temperature by using an area-beam type electron beam emitter (manufactured by Nisshin High Voltage Co., Ltd., product name: Curetron).

The shaped articles thus obtained were measured for tensile strength and tensile modulus. A testing method is described below. The results are given in Tables 3 and 4.

TENSILE STRENGTH AND TENSILE MODULUS

A tensile testing machine (manufactured by Orientic Co., Ltd., machine designation: Tensilon) was employed to conduct measurements according to JIS K 7113. Dumbbell specimens of size #2 were used.

A surface condition of each specimen was observed. In Tables 3 and 4, the specimens which showed bleeding at surfaces thereof are indicated by the expression "occurred" while the specimens which showed no bleeding are indicated by the expression "not occurred".

TABLE 1

| Example No. | PE M.W.[1] | HEAT TRMT. | CAL. RATIO | CAL. TEMP. (° C.) | STR. RATIO | STR. TEMP. (° C.) | PUC[2] (PARTS) | RADICAL GENERATOR (PARTS) | IRRADIATION |
|---|---|---|---|---|---|---|---|---|---|
| 1 | 330000 | UNDONE | 7.0 | 115 | 3.6 | 95. | TMPTM[3]: 5 | BP[6]: 1 | UV |
| 2 | 330000 | UNDONE | 7.1 | 115 | 4.6 | 95 | TMPTM[3]: 15 | BP[6]: 1 | UV |
| 3 | 330000 | UNDONE | 7.1 | 115 | 4.0 | 95 | TMPTM[3]: 25 | BP[6]: 1 | UV |
| 4 | 150000 | UNDONE | 7.0 | 115 | 4.3 | 95 | TMPTM[3]: 15 | BP[6]: 1 | UV |
| 5 | 220000 | UNDONE | 7.0 | 115 | 4.1 | 95 | TMPTM[3]: 15 | BP[6]: 1 | UV |
| 6 | 330000 | UNDONE | 6.9 | 115 | 4.4 | 95 | DVB[4]: 15 | BP[6]: 1 | UV |
| 7 | 330000 | UNDONE | 7.0 | 115 | 4.4 | 95 | TMPTM[3]: 15 | — | EB |
| 8 | 330000 | DONE | 7.0 | 115 | 4.9 | 95 | TMPTM[3]: 15 | BP[6]: 1 | UV |
| 9 | 330000 | UNDONE | 7.0 | 115 | 4.9 | 1ST TEMP.: 95 2ND TEMP.: 80 | TMPTM[3]: 15 | BP[6]: 1 | UV |
| 10 | PP M.W. 150000 | UNDONE | 6.9 | 145 | 4.5 | 160 | TMPTM[3]: 15 | BP[6]: 1 | UV |
| 11 | 330000 | UNDONE | 7.1 | 115 | 4.5 | 95 | TAI[5]: 15 | BP[6]: 1 | UV |
| 12 | 330000 | UNDONE | 7.3 | 115 | 4.0 | 95 | TAI[5]: 3 | BP[6]: 1 | UV |
| 13 | 330000 | UNDONE | 7.0 | 115 | 4.4 | 95 | TMPTM[3]: 15 | BP[6]: 1 | UV |
| 14 | 330000 | UNDONE | 7.3 | 115 | 4.0 | 95 | TMPTM[3]: 3 | BP[6]: 1 | UV |
| 15 | 330000 | UNDONE | 8.9 | 115 | 3.6 | 95 | TAI[5]: 15 | BP[6]: 1 | UV |
| 16 | 330000 | UNDONE | 7.2 | 115 | 4.3 | 110 | TAI[5]: 15 | BP[6]: 1 | UV |
| 17 | 330000 | UNDONE | 7.3 | 85 | 4.1 | 95 | TAI[5]: 15 | BP[6]: 1 | UV |

[1]M.W. = MOLECULAR WEIGHT
[2]PUC = POLYMERIZABLE UNSATURATED COMPOUND
[3]TMPTM = TRIMETHYLOLPROPANE TRIMETHACRYLATE
[4]DVB = DIVINYL BENZENE
[5]TAI = TRIALLYL ISOCYANURATE
[6]BP = BENZOPHENONE

TABLE 2

| COMP. EXAMPLE No. | PE M.W.[1] | HEAT TRMT. | CAL. RATIO | CAL. TEMP. (° C.) | STR. RATIO | STR. TEMP. (° C.) | PUC[2] (PARTS) | GENERATOR (PARTS) | IRRADIATION |
|---|---|---|---|---|---|---|---|---|---|
| 1 | 330000 | UNDONE | 7.0 | 115 | 3.2 | 95 | — | — | UV |
| 2 | 330000 | UNDONE | 6.9 | 115 | 3.4 | 95 | TMPTM[3]: 35 | BP[6]: 1 | UV |
| 3 | 330000 | UNDONE | 7.1 | 115 | 4.6 | 95 | TMPTM[3]: 15 | BP[6]: 1 | NONE |
| 4 | 330000 | UNDONE | 7.1 | 115 | 4.0 | 95 | TMPTM[3]: 25 | BP[6]: 1 | NONE |
| 5 | 150000 | UNDONE | 7.1 | 115 | 4.0 | 95 | — | — | UV |
| 6 | 330000 | UNDONE | 7.1 | 115 | 4.6 | 95 | TMPTM[3]: 15 | — | UV |
| 7 | PP M.W. 150000 | UNDONE | 7.0 | 145 | 3.5 | 160 | — | — | UV |

TABLE 2-continued

| COMP. EXAMPLE No. | PE M.W.[1] | HEAT TRMT. | CAL. RATIO | CAL. TEMP. (° C.) | STR. RATIO | STR. TEMP. (° C.) | PUC[2] (PARTS) | GENERATOR (PARTS) | IRRADIATION |
|---|---|---|---|---|---|---|---|---|---|
| 8 | PP M.W. 150000 | UNDONE | 6.9 | 145 | 4.5 | 160 | TMPTM[3]: 15 | BP[6]: 1 | NONE |

[1]M.W. = MOLECULAR WEIGHT
[2]PUC = POLYMERIZABLE UNSATURATED COMPOUND
[3]TMPTM = TRIMETHYLOLPROPANE TRIMETHACRYLATE
[4]DVB = DIVINYL BENZENE
[5]TAI = TRIALLYL ISOCYANURATE
[6]BP = BENZOPHENONE

TABLE 3

| Example No. | OVERALL ORIENTATION RATIO*) | STRENGTH (GPa) | MODULUS (GPa) | BLEEDING THROUGH AN ORIENTED SHEET |
|---|---|---|---|---|
| 1 | 25.2 | 0.68 | 38.4 | NOT OCCURRED |
| 2 | 32.7 | 0.71 | 43.5 | NOT OCCURRED |
| 3 | 28.4 | 0.68 | 39.8 | NOT OCCURRED |
| 4 | 30.1 | 0.65 | 36.5 | NOT OCCURRED |
| 5 | 28.7 | 0.69 | 38.1 | NOT OCCURRED |
| 6 | 30.4 | 0.70 | 40.1 | SLIGHTLY OCCURRED |
| 7 | 30.8 | 0.72 | 42.1 | NOT OCCURRED |
| 8 | 34.3 | 0.82 | 46.2 | NOT OCCURRED |
| 9 | 34.3 | 0.81 | 45.0 | NOT OCCURRED |
| 10 | 31.1 | 0.40 | 16.1 | NOT OCCURRED |
| 11 | 32.0 | 0.77 | 44.5 | NOT OCCURRED |
| 12 | 29.2 | 0.71 | 40.1 | NOT OCCURRED |
| 13 | 30.8 | 0.75 | 42.8 | NOT OCCURRED |
| 14 | 29.2 | 0.68 | 39.8 | NOT OCCURRED |
| 15 | 32.0 | 0.78 | 45.0 | NOT OCCURRED |
| 16 | 31.0 | 0.73 | 43.0 | NOT OCCURRED |
| 17 | 29.9 | 0.68 | 37.8 | NOT OCCURRED |

*)OVERALL ORIENTATION RATIO = PRODUCT OF A CALENDER RATIO AND A STRETCH RATIO

TABLE 4

| COMP. EXAMPLE NO. | OVERALL ORIENTATION RATIO*) | STRENGTH (GPa) | MODULUS (GPa) | BLEEDING THROUGH AN ORIENTED SHEET |
|---|---|---|---|---|
| 1 | 22.4 | 0.64 | 33.5 | NOT OCCURRED |
| 2 | 23.5 | 0.63 | 32.4 | NOT OCCURRED |
| 3 | 32.7 | 0.54 | 30.1 | OCCURRED |
| 4 | 28.4 | 0.49 | 28.7 | OCCURRED |
| 5 | 28.4 | 0.58 | 31.9 | NOT OCCURRED |
| 6 | 32.7 | 0.61 | 33.2 | OCCURRED |
| 7 | 24.5 | 0.31 | 10.5 | NOT OCCURRED |
| 8 | 31.1 | 0.38 | 14.2 | OCCURRED |

*)OVERALL ORIENTATION RATIO = PRODUCT OF A CALENDER RATIO AND A STRETCH RATIO

Examples 1–3 and Comparative Examples 1 and 2 were contemplated to examine the influence from the amount of trimethylolpropane trimethacrylate. As can be clearly seen from Tables 1 through 4, the shaped articles of all Examples exhibit increased tensile strengths and tensile moduli compared to the shaped article of Comparative Example 1 which excluded trimethylolpropane trimethacrylate. As can be appreciated from the comparison between Example 3 and Comparative Example 2, there apparently exists a maximum effective amount of trimethylolpropane trimethacrylate. Incorporation thereof in the amount beyond that maximum level is found to adversely affect mechanical properties of resulting shaped articles.

The shaped articles of Comparative Examples 3 and 4 were not subjected to polymerization by UV irradiation, while otherwise equivalent to those of Examples 2 and 3. The results demonstrate that the shaped articles, unless polymerized, accompany the occurrence of bleeding and the reduction in mechanical properties, as indicated in Table 4.

As apparent from the comparisons among Examples 4–6, the use of polyethylene having an increased molecular weight results in the increased strength and modulus of a resulting shaped article.

As also apparent from the results of Example 6, the use of a bifunctional compound, divinyl benzene, as a polymerizable unsaturated compound, results in the formation of the shaped article which exhibits comparable strength and modulus but a slightly increased degree of bleeding, due to the reduced reactivity of divinyl benzene, relative to the shaped article of Example 2 which instead incorporated a trifunctional compound, trimethylolpropane triacrylate. Yet, the high-density polyethylene sheet obtained in Example 6 apparently exhibits sufficient strength and modulus as contrasted with the high-density polyethylene sheets obtained in Comparative Examples 1–4.

In Example 7, trimethylolpropane trimethacrylate was polymerized without the aid of benzophenone, i.e., by EB irradiation. Also in this case, the resulting high-density polyethylene sheet is found to exhibit sufficient strength and modulus without appreciable occurrence of bleeding at its surface.

Example 8 followed the procedure of Example 2, except that the aforementioned heat treatment was carried out prior to the calendering process. Results demonstrate that the heat treatment contributes to the enhanced strength and modulus of the high-density polyethylene sheet obtained in Example 8, compared to those of the high-density polyethylene sheet obtained in Example 2.

In Example 9, the practice of multi-stage stretching with the reduced orientation temperature at the final stage thereof is considered to result in the formation of the high-density polyethylene sheet which showed the increased overall orientation ratio of 34.1, production of a number of microvoids and occurrence of whitening. Also, the high-density polyethylene sheet obtained in Example 9 exhibited a density of 0.85, while the high-density polyethylene sheet obtained in Example 2 exhibited a density of 0.95. This demonstrates that the density reduction is attainable.

In Example 10, the aforementioned high-density polyethylene having a weight-average molecular weight of $1.5 \times 10^5$ and a melting point of 165° C. was used, a calendering temperature and an orientation temperature set at 145° C. and 160° C., respectively. The practice of Example 10 also resulted in the formation of the high-density polypropylene sheet which showed sufficient levels of strength and modulus without occurrence of bleeding, as apparent from comparison of their values indicated in Table 3 to physical values, listed in Table 4, of the sheets obtained in Comparative Examples 7 and 8 which used the same high-density polypropylene as in Example 10.

Comparative Example 6 followed the procedure of Example 2, except that benzophenone was not added. Due to the absence of a free-radical generating source, UV irradiation was not effective to polymerize trimethylolpropane trimethacrylate, resulting in the appreciable occurrence of exudation in the oriented sheet.

EFFECTS OF THE INVENTION

As described above, in accordance with the present invention as recited in claim 1, a polyolefin shaped article having high strength and high modulus can be efficiently produced without a need to accompany a step of removing a flow modifier and the like.

Particularly in accordance with the invention as recited in claim 2, the use of a high-density polyethylene for the high-density polyolefin results in the efficient manufacture of polyolefin shaped articles having high strength and high modulus.

In accordance with the invention as recited in claim 3, the further incorporation of a free-radical initiator in the aforementioned composition becomes effective when its activation promotes polymerization of a polymerizable unsaturated compound. This enables efficient production of polyolefin shaped articles having high strength and high modulus without a need to include a step of removing the polymerizable unsaturated compound.

In accordance with the invention as recited in claim 4, a photoinitiator is used as the free-radical initiator and the step of polymerizing the polymerizable unsaturated compound, which follows the stretching step, is carried out by UV irradiation. This unlikely causes the reduction in mechanical properties of a shaped article resulting from heat shrinkage or stretching thereof. Also, the use of UV irradiation to activate the photoinitiator insures ready and complete polymerization of the polymerizable unsaturated compound with the use of inexpensive facilities.

In the invention as recited in claim 5, the use of EB irradiation to polymerize the aforementioned polymerizable unsaturated compound unlikely causes the reduction in mechanical properties of a shaped article resulting from heat shrinkage or stretching thereof, while insuring production of polyolefin shaped articles having improved mechanical properties such as strength and modulus.

In the invention as recited in claim 6, the use of a highly reactive, trifunctional compound for the above polymerizable unsaturated compound reduces a possibility for a polymerizate of the polymerizable unsaturated compound to bleed on a surface of a resulting polyolefin shaped article.

In the invention as recited in claim 7, the sheet or film is calendered at a calender ratio in the range of 2–10. This results not only in the reduced burden on the subsequent stretching step, but also in achievement of uniform calendering which prevents the calendered sheet or film from being broken in the subsequent stretching step.

In the invention as recited in claim 8, the sheet or film is stretched at a stretch ratio of at least 2. This results not only in obtaining polyolefin shaped articles excellent in strength and modulus but also in the reduced occurrence of breakage of the shaped articles while stretched.

In the invention as recited in claim 9, the use of high-density high-molecular weight polyethylene having a weight-average molecular weight in the range of 200,000–500,000, as the high-density polyolefin resin, results in obtaining polyolefin shaped articles having further enhanced strength and modulus. In the invention as recited in claim 10, the practice of calendering at a temperature in the range of 70–120° C. produces an adequate pressure force to result not only in the achievement of uniform calendering but also in the reduced occurrence of breakage of polyolefin shaped articles while being calendered.

In the invention as recited in claim 11, the practice of stretching at a temperature within the range from 70° C. to a melting temperature of high-density polyethylene reduces the occurrences of whitening in the high-density polyethylene shaped articles and of breakage thereof while stretched, resulting in stably obtaining the strength enhancement effect expected from the stretching.

In the invention as recited in claim 12, the sheet or film is subjected to heat treatment, at least prior to being stretched. This results in the improvement in crystalline arrangement of the sheet or film, which promotes the orientation enhancement effect of the subsequently-performed stretching to allow a smoother operation of the stretching step.

In the invention as recited in claim 13, the multi-stage stretching is performed such that stretching at a final stage is equidirectionally effected at an orientation temperature within a range of 35° C. to 5° C. reduction from an orientation temperature used in stretching at a stage immediately before the final stage. This results in the stable production of microvoids in the polyolefin shaped articles while stretched at the final stage, leading to the reduced density thereof.

What is claimed is:

1. A method for manufacture of a polyolefin shaped article comprising the steps of:
   (a) first melt forming a composition principally containing 100 parts by weight of high density polyolefin and 3–30 parts by weight of a polymerizable unsaturated compound having a preferred affinity for the high-density polyolefin into a sheet or film,
   (b) calendering said sheet or film,
   (c) stretching the calendered sheet or film, and
   (d) then polymerizing the polymerizable unsaturated compound having flow modifier properties incorporated in the stretched sheet or film,
   wherein the polyolefin shaped article has a tensile strength of at least 0.40 GPa and a tensile modulus of at least 16.1 GPa, and the polymerized unsaturated compound remains in the polyolefin shaped article.

2. The method for manufacture of a polyolefin shaped article as recited in claim 1, wherein said high-density is polyolefin is high-molecular weight polyolefin.

3. The method for manufacture of a polyolef in shaped article of claim 2, wherein said composition further contains a free-radical initiator.

4. The method for manufacture of a polyolefin shaped article of claim 2, wherein said polymerizable unsaturated compound is polymerized by electron beam irradiation.

5. The method for manufacture of a polyolefin shaped article as recited in claim 1, wherein said composition further contains a free-radical initiator.

6. The method of manufacture of a polyolefin shaped article of claim 5, wherein said free-radical initiator is a photoinitiator and the step of polymerizing the polymerizable unsaturated compound incorporated in the stretched sheet or film is carried out by ultraviolet irradiation.

7. The method for manufacture of a polyolefin shaped article of claim 1, wherein the step of polymerizing said polymerizable unsaturated compound is carried out by electron beam irradiation.

8. The method for manufacture of a polyolefin shaped article of claim 1, wherein at least a part of said polymerizable unsaturated compound is a trifunctional compound.

9. The method for manufacture of a polyolefin shaped article of claim 1, wherein, in the step of calendering the sheet or film, the calendering is effected at a calender ratio in the range of 2–10.

10. The method for manufacture of a polyolefin shaped article of claim 1, wherein, in the step of stretching the sheet or film, the stretching is effected at a stretch ratio of at least 2.

11. The method for manufacture of a polyolefin shaped article of claim 1, wherein said high-density polyolefin is high-density polyethylene having a weight-average molecular weight in the range of 200,000–500,000.

12. The method for manufacture of a polyolefin shaped article in claim 11, wherein the calendering is effected at a temperature within the range of 70–120° C.

13. The method for manufacture of a polyolefin shaped article of claim 12, wherein the stretching is effected at a temperature within the range of from 70° C. to a melting point of said high-density polyethylene.

14. The method for manufacture of a polyolefin shaped article in claim 11, wherein the stretching is effected at a temperature within the range of from 70° C. to a melting point of said high-density polyethylene.

15. The method for manufacture of a polyolefin shaped article of claim 1, wherein further comprising a step of subjecting the sheet or film to heat treatment, at least prior to the stretching step.

16. The method for manufacture of a polyolefin shaped article of claim 1, wherein the stretching step comprises multi-stage stretching steps which effect stretching equidirectionally at two or more stages, and said multi-stage stretching steps include a final-stage stretching step which effects equidirectional stretching at an orientation temperature within a range of 35° C. to 5° C. reduction from an orientation temperature used in a stretching step immediately before the final-stage stretching step.

* * * * *

UNITED STATES PATENT AND TRADEMARK OFFICE
CERTIFICATE OF CORRECTION

PATENT NO. : 6,241,937 B1  
DATED : June 5, 2001  
INVENTOR(S) : M. Nakamura et al.

Page 1 of 1

It is certified that error appears in the above-identified patent and that said Letters Patent is hereby corrected as shown below:

<u>Title page,</u>  
The title should read -- METHOD FOR MANUFACTURE OF POLYOLEFIN SHAPED ARTICLES --.

Signed and Sealed this

Fifth Day of February, 2002

*Attest:*

JAMES E. ROGAN  
*Director of the United States Patent and Trademark Office*

*Attesting Officer*